United States Patent
Liu

(10) Patent No.: US 8,014,633 B2
(45) Date of Patent: Sep. 6, 2011

(54) METHOD AND APPARATUS FOR SUPPRESSING RINGING ARTIFACTS WITHIN SUPER-RESOLUTION IMAGE PROCESSING

(75) Inventor: Ming-Chang Liu, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 813 days.

(21) Appl. No.: 12/103,438

(22) Filed: Apr. 15, 2008

(65) Prior Publication Data

US 2009/0257684 A1    Oct. 15, 2009

(51) Int. Cl.
*G06K 9/32* (2006.01)
(52) U.S. Cl. ........................................ 382/299
(58) Field of Classification Search .......... 382/298–300, 382/100, 274–275, 236; 348/441–448; 358/1.2, 358/1.9, 3.01; 375/240.16
See application file for complete search history.

(56) References Cited

U.S. PATENT DOCUMENTS

| | | | |
|---|---|---|---|
| 7,659,939 B2 * | 2/2010 | Winger et al. | 348/448 |
| 7,742,660 B2 * | 6/2010 | Keshet | 382/298 |
| 7,787,047 B2 * | 8/2010 | Wada | 348/448 |
| 7,796,301 B2 * | 9/2010 | Solecki | 358/3.01 |
| 7,809,155 B2 * | 10/2010 | Nestares et al. | 382/100 |
| 7,856,154 B2 * | 12/2010 | Young | 382/299 |
| 2005/0100240 A1 | 5/2005 | Ikeda et al. | |
| 2009/0245375 A1 * | 10/2009 | Liu | 375/240.16 |
| 2010/0119176 A1 * | 5/2010 | Ichihashi et al. | 382/300 |
| 2011/0037894 A1 * | 2/2011 | Sbaiz | 348/441 |

* cited by examiner

*Primary Examiner* — Sherali Ishrat
(74) *Attorney, Agent, or Firm* — John P. O'Banion

(57) ABSTRACT

Apparatus and methods for reducing ringing artifacts when generating super-resolution pictures and/or videos and for controlling the balance between sharpness and introduction of artifacts. After motion estimation and motion masking for all input frames, the method enters a frame loop within which high frequency information is extracted from the input SR image for each low-resolution input image. Extracted information from each input frame is not directly utilized within the frame loop for changing the SR input as with conventional SR processes, but is used within a means for averaging high frequency information over a desired number of frames (N) and outputting higher resolution versions of low resolution images. Changing (N) alters the tradeoff between ringing suppression and sharpness boosting. Invention can be implemented in a number of imaging apparatus, in particular those having a processor for executing the method steps.

20 Claims, 4 Drawing Sheets

METHOD AND APPARATUS FOR SUPPRESSING RINGING ARTIFACTS WITHIN SUPER-RESOLUTION IMAGE PROCESSING

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to the generation of higher-resolution pictures and video from lower-resolution pictures and videos, and more particularly to controlling artifacts and noise when generating these higher-resolution pictures and video.

2. Description of Related Art

Apparatus and methods for simplifying the creation of high-definition (high-resolution) content have become increasingly sought after by the photographic and more particularly video industries. The increased importance of these mechanisms is especially profound in view of recent changes which make high-definition video content the standard for video streams.

Techniques are being increasingly implemented for creating higher-resolution images from lower-resolution images. These resultant higher-resolution pictures (whether used in still pictures or video), are created by utilizing higher resolution information (such as from fusing together several low-resolution (LR) to form one enhanced-resolution image) to increase the resolution of an input image or image stream within a 'super-resolution' (SR) technique. Thus, super-resolution (SR) techniques enhance the resolution of an imaging system. Single-frame and multiple-frame variants of SR techniques exist, with multiple-frame techniques being generally considered the most useful.

However, these existing super-resolution techniques are subject to a number of problems. One shortcoming of SR techniques is that it is very difficult to make tradeoffs between sharpness and artifact elimination caused by ringing. In creating super-resolution images, the high-frequency components are boosted, which not only creates stronger ringing artifacts, but emphasizes the noise component. These ringing problems are noticeable with regard to pictures, yet can be even more pronounced when viewing video. The inability to effectively tradeoff between sharpness and the elimination of ringing artifacts poses a serious challenge for existing techniques.

One common approach to increasing picture resolution, is shown in FIG. 1 wherein an up-scale filtering process is applied through changing the initial SR picture. The flowchart depicts loading lower-resolution (LR) frames and performing motion estimation (ME) and motion masking on all frames, prior to entering a frame loop. Within the frame loop high frequency information is extracted from the SR input to boost the low resolution information. Then according to this conventional process, the SR picture is updated for each frame in the loop. After processing all frames in this manner the frame loop ends and processing completes.

The conventional state-of-art SR technique of FIG. 1, and others with similar high frequency processing, are subject to a number of problems. One problem is that as the image is sharpened a significant amount of ringing is induced about the edge areas. This problem arises in response to error propagation combining with the high-frequency contents update, and the problem becomes much worse in response to noisy input sources.

In these current super-resolution techniques a high-resolution picture is created from multiple lower-resolution pictures based on a number of estimate models. These estimate models include the following. (1) Creating models of processes from high-resolution (HR) pictures to low-resolution (LR) pictures; such as utilizing geometrical warp models, blurring models, and decimation models. (2) Specific techniques for each of these models can be utilized for reversing the process. (3) Iteratively updating the super-resolution (SR) picture from the initial guess based on a set of LR pictures. A number of issues arise when utilizing these existing super-resolution techniques, such as the accentuation of noise and ringing artifacts in response to boosting high-frequency picture components, and the difficult of making trade-offs between increasing sharpness and decreasing ringing artifacts.

Accordingly, a need exists for super-resolution techniques which reduce ringing and noise problems while facilitating the selection of tradeoffs between increasing sharpness and decreasing ringing artifacts.

BRIEF SUMMARY OF THE INVENTION

A method is described for reducing ringing artifacts when utilizing super-resolution techniques, and for controlling the balance between sharpness and the introduction of ringing and other artifacts. An improved form of SR processing is taught herein which handles SR picture input and high frequency boosting of the input images without introducing cumulative error and associated ringing and noise. High frequency information is extracted from each additional frame is not directly used for updating the SR picture, as in conventional techniques, but is utilized within an averaging means. In one aspect of the invention, the averaging means performs weighted averaging in response to the accuracy of motion for each frame in the loop. The method successfully suppresses noise and ringing artifacts, while balancing the trade-off between sharpness and artifacts.

The following terms are generally described in relation to the specification, and are not to be interpreted toward constraining specific recitations of the specification.

The invention can be applied to sequences of still images, or to video sequences (e.g., video or movies), wherein the terms "video" and "movie" are used synonymously. The invention can be equally applied to either color or monochrome imaging of any desired format. In addition, the term "image", "frame" and "picture" are also utilized synonymously.

The term "resolution" or "sharpness" as applied to images typically refers to spatial resolution, whereby if the text herein does not specify "temporal resolution" or "spatial resolution", then it can be considered to refer to spatial resolution in the most common context of the word "resolution". It will be noted that the term "high-resolution" and "high-definition" are both directed at spatial resolution aspects. One of ordinary skill in the art will recognize that spatial resolutions are generally stated as a number of vertical and horizontal rows of pixels (e.g., 800×600, 1024×768, 1280×720, 1920×1080 and so forth), or as a number of pixels in the frame. Furthermore, those skilled in this area of art will recognize that temporal resolution regards the image rate, or period between images, such as given by the number of frames per second within the image stream.

The term "super-resolution" (SR) is utilized herein to describe a process for processing images of a first resolution to achieve images at a higher, second, resolution—thus increasing (boosting) image sharpness. Thus, the term "super-resolution" as used herein, does not denote a particular level of spatial resolution, such as being above "high-resolution", but a process toward increasing resolution. One of ordinary skill in the art will appreciate that super-resolution (SR) techniques can be applied to images of any spatial resolution toward increasing spatial resolution.

The invention is amenable to being embodied in a number of ways, including but not limited to the following descriptions.

One embodiment of the invention is a method of generating higher-resolution images from lower-resolution images within a super-resolution technique, comprising: (a) loading available low-resolution frames; (b) estimating motion for available low-resolution frames; (c) performing motion masking for available low-resolution frames; (d) performing a frame loop as follows for each frame of the available low-resolution frames for, (d)(i) extracting high frequency information from an input SR image for each low-resolution frame, and (d)(ii) updating high frequency components of the low-resolution frames in response to averaging the high frequency information over a desired number of frames, N, without updating the SR input, and (d)(iii) outputting higher resolution versions of the low-resolution frames. The embodiment allows the tradeoff between suppression of ringing and the desired sharpness boost to be established in response to setting the number of frames, N, across which the average is taken. It will be appreciated that unlike conventional techniques, the averaging process does not comprise an up-scale filtering process applied through changing the initial SR picture for each frame within the loop.

Different implementations or modes of the present invention can utilize different forms of averaging. The term "average" is used herein as a determination of a central tendency of the data set, in this case in relation to the extracted high frequency information. It should be appreciated that many different descriptive statistics can be chosen as a measurement of this central tendency of the data items. Although the invention is preferably directed to the use of averaging in the form of an arithmetic mean (preferably weighted in response to detected image conditions and characteristics of the frames), it can be less preferably implemented utilizing other forms of averaging, such as geometric means, RMS means, truncated means, based on standard deviation and so forth.

In at least one mode of the invention a weighted average is performed with higher weights given to high frequency information associated with higher levels of the motion estimation, and lower weights given to high frequency information associated with low accuracy motion estimation.

In at least one implementation of the invention the super-resolution method is performed by at least one computer which executes the method steps as programming executing on a computer, or as media containing programming executable on a computer. The method can be implemented for use in a number of different applications, for example including but not limited to, still and video cameras, image processing systems, image processing software, medical imaging, industrial imaging, scientific imaging, other forms of image processing, and combinations thereof.

One embodiment of the invention is a method of generating higher-resolution images from lower-resolution images within a super-resolution technique, comprising: (a) loading available low-resolution frames; (b) estimating motion for available low-resolution frames; (c) performing motion masking for available low-resolution frames; and (d) performing a frame loop as follows for each frame of the available low-resolution frames for, (d)(i) extracting high frequency information from an input SR image for each low-resolution frame, and (d)(ii) updating high frequency components of the images of the low-resolution frames in response to weighted averaging of the high frequency information over a desired number of frames, N, toward suppressing non-recurrent noise and without updating the SR input being input, wherein the weighted averaging assigns higher weights to high frequency information associated with higher levels of the motion estimation, and lower weights to high frequency information associated with low accuracy motion estimation, (d)(iii) outputting higher resolution versions of the low resolution images; wherein by increasing the number of frames, N, ringing artifacts are reduced, while less sharpness boost is received in response to the method.

One embodiment of the invention is an apparatus for generating higher-resolution images from lower-resolution images within a super-resolution technique, comprising: (a) a computer configured for processing sequences of images; and (b) programming executable on the computer for, (b)(i) loading available low-resolution frames; (b)(ii) estimating motion for available low-resolution frames; (b)(iii) performing motion masking for available low-resolution frames; (b)(iv) extracting high frequency information from an input SR image for each of the available low-resolution frame within a frame loop; (b)(v) updating high frequency components of each of the available low-resolution frames within the frame loop in response to an averaging of the high frequency information over a desired number of frames, N, without updating the SR input; and (b)(vi) outputting higher resolution versions of the low resolution images.

One embodiment of the invention is a computer-readable media containing a computer program executable on a computer configured for performing a super-resolution technique on video images and causing the computer to output images having higher spatial resolution that the images being input to the computer, comprising: (a) loading available low-resolution frames; (b) estimating motion for available low-resolution frames; (c) performing motion masking for available low-resolution frames; (d) extracting high frequency information from an input SR image for each of the available low-resolution frame within a frame loop; and (e) updating high frequency components of each of the available low-resolution frames within the frame loop in response to an averaging of the high frequency information over a desired number of frames, N, without updating the SR input, and outputting higher resolution versions of the low resolution images.

The present invention provides a number of beneficial aspects which can be implemented either separately or in any desired combination without departing from the present teachings.

An aspect of the invention is an apparatus and method for improving the generation of higher-resolution pictures and videos from lower-resolution ones.

Another aspect of the invention is the reduction of ringing artifacts when creating high-resolution images from lower-resolution images.

Another aspect of the invention is the reduction of noise when boosting high-frequency signal components.

Another aspect of the invention is an SR technique which does not contaminate the original SR image with prediction errors.

Another aspect of the invention is an SR technique which updates the high-frequency components in response to averaging performed across a selected number of frames/images.

Another aspect of the invention is an SR technique in which increasing the number of frames/images (value of N) reduces the extent of ringing artifacts, while decreasing the value of N leads to increased sharpness.

Another aspect of the invention is an SR technique which filters out non-recurrent noise from the high-frequency information to a desired extent.

Another aspect of the invention is an SR technique in which ringing suppression is performed within the frame loop.

A still further aspect of the invention is an SR technique whose ringing suppression characteristics can be controlled in response to the use of different averaging mechanisms and extents.

Another aspect of the invention is its broad applicability to the generation of increased resolution video frames, such as for applications including still and video cameras, image processing systems and software, medical imaging, industrial imaging, scientific imaging, other known image systems and combinations thereof.

A still further aspect of the invention is the ability to implement the approach as an apparatus, method, programming executing on a computer, or as media containing programming executable on a computer.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Figures 1, 2:
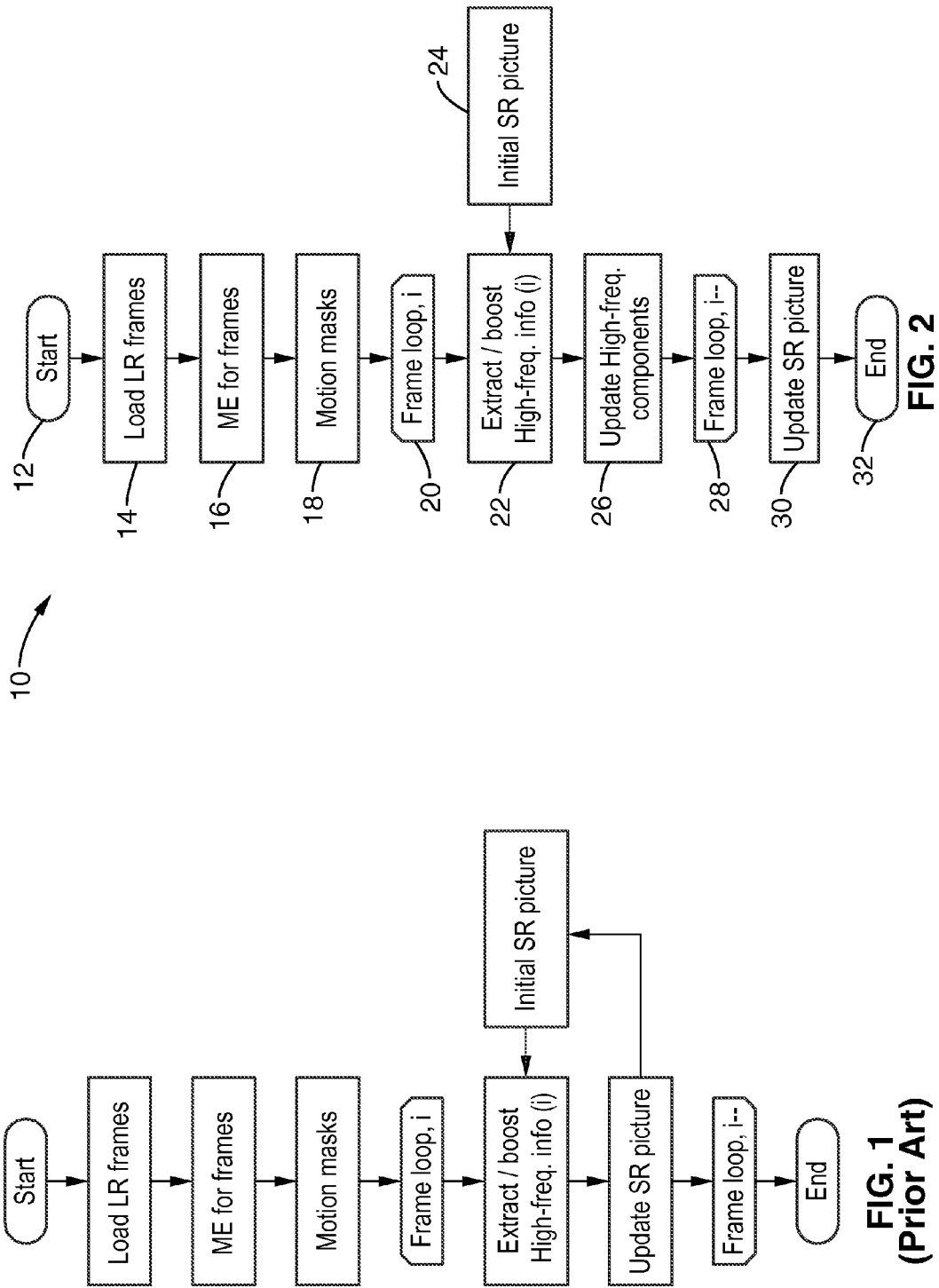
FIG. 1 is a flowchart of a conventional method of generating higher-resolution pictures from lower-resolution pictures within a super-resolution (SR) technique.
FIG. 2 is a flowchart of an associated method according to an aspect of the present invention for generating higher-resolution pictures from lower-resolution pictures.

Referring more specifically to the drawings, for illustrative purposes the present invention is embodied in the apparatus generally shown in FIG. 2-4, and FIG. 5B. It will be appreciated that the apparatus may vary as to configuration and as to details of the parts, and that the method may vary as to the specific steps and sequence, without departing from the basic concepts as disclosed herein.

The present invention provides an improved SR technique which suppresses ringing. In the present invention a number of aspects are described for ameliorating ringing artifacts and noise, while providing a mechanism for controlling tradeoffs between sharpness and noise.

Iterative operations are necessary in conventional SR processing toward assuring convergence to an optimized result based on the assumptions, because the models for mimicking the capture of low-resolution pictures from higher-resolution scene are estimated. The conventional methods continue updating the SR picture with extracted high frequency components and utilizing this updated SR picture as a base for the next update. This iterative process creates unavoidable ringing artifacts on the SR image. For example, with the state-of-art method of projections onto convex sets (POCS), as the image is sharpened, the ringing artifacts are made more pronounced. This arises because the whole concept of these SR operations is directed at extracting the missing high frequency components from other low-resolution pictures and updating the SR picture with these high frequency components. However, these high frequency components are estimated and thus include errors. Hence, each iteration is trying to correct previous errors with another set of high frequency components which contain additional errors, thus ringing artifacts are generated.

In order to avoid the generation of ringing artifacts, or to suppress them, the present invention retains the SR reference picture without updating it during each iteration of the frame loop, thereby avoiding error propagation. The present invention thus smoothes out high-frequency components toward reducing ringing and noise by averaging the extracted high frequency information over a number of frames (images). In one mode of the invention the degree of averaging is determined in response to the number (N) of high frequency components being averaged, therein selectively controlling the extent to which ringing and noise are reduced. It should be appreciated that the value selected for N determines the tradeoff between sharpness and ringing for this inventive approach.

It should be appreciated that for the sake of simplicity, a straight-forward weighted average is described herein, although the present invention may utilize various forms of averaging controlled in various ways without departing from the teachings of the present invention. For example an averaging technique may be performed in response to system parameters and characteristics of the process. By way of example, one embodiment can be implemented utilizing a weighted average based on the reliability of available motion estimation. In this way, more weight is accorded to high-frequency content associated with area of good motion estimation matches, while less weight is accorded to high frequency components associated with less dependable motion estimation. As a result of this process, the weighted-average high frequency components provide a higher contribution as they contain more reliable information, wherein they introduce less ringing and noise artifacts.

FIG. 2 illustrates an embodiment 10 of an inventive SR process which starts at block 12, loads all the available low resolution (LR) frames at block 14, performs motion estimation for all these frames at block 16, executes motion masks at block 18, then enters a frame loop at block 20. Within the frame loop 20 the frame counter controls processing of the frames. High frequency information is extracted or boosted at block 22 in response to input of an initial SR picture at block 24 from scaling a selected low-resolution picture. Note that unlike FIG. 1, the SR picture is not updated at each loop frame in the frame loop. The SR picture data remains unchanged during the frame loop. With this approach, the reference SR picture (initial SR picture here) will not be contaminated by the prediction errors, wherein error propagation problems are avoided. The high frequency information is then received by block 26 which updates the high frequency components, such as in response to an averaging means across multiple frames. Frame number (i) is decremented in block 28, and processing returns to block 22, unless all frames have been processed, wherein the SR picture is finally updated at block 30, after which the end of processing is reached at block 32.

Figure 3:
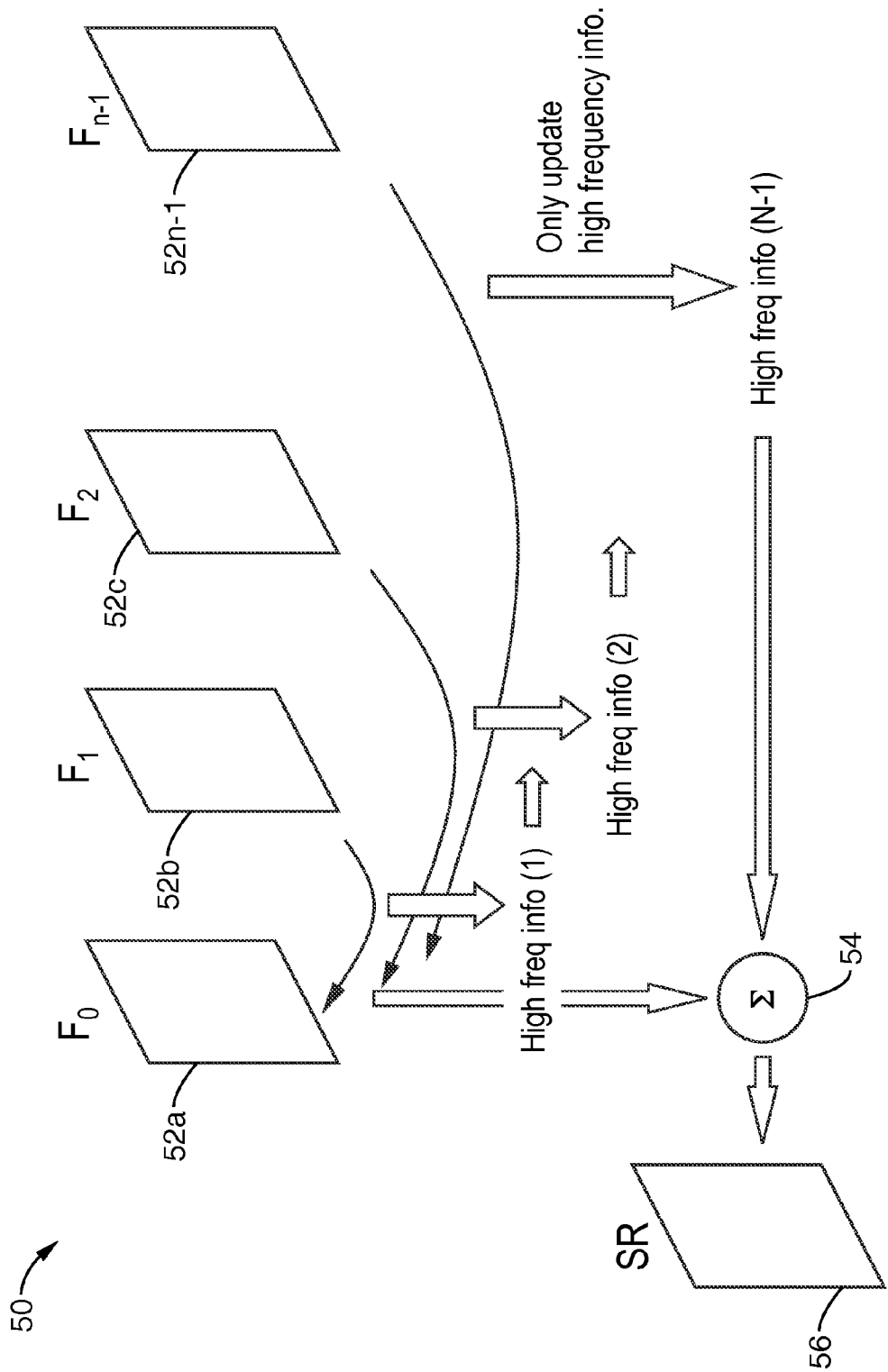
FIG. 3 is a schematic of updating high-frequency information according to an aspect of the present invention.

FIG. 3 illustrates an embodiment 50 of the invention in which high-frequency components between frames are averaged. Frames $52a$ through $52n-1$ are shown in the figure between which high-frequency information (1), (2) through (N−1) is determined. A weighted average 54 is performed on this high-frequency information before it is utilized in super-resolution frame 56.

It will be appreciated that according to this invention, the tradeoff between sharpness and ringing can be controlled in response to varying the value of N used for controlling the averaging mechanism (e.g., simple averaging). Thus, the higher the number of frames utilized, the fewer ringing and noise artifacts will appear, while the sharpness boost may not be as pronounced. Conceptually, the (weighted) averaging operates in a manner similar to low-pass filtering toward suppressing high-frequency prediction error. It should be appreciated that for non-recurrent noise (e.g., random noise) the same noise will not appear at the same corresponding pixel through different frames, whereby the averaging means (e.g., weighted average) successfully suppresses the noise. Therefore, by increasing the number of frames over which the average is taken, the amount of noise suppression is increased. By way of example and not limitation, one of the tested embodiments utilizes averaging across seven frames within the SR process.

Figure 4:
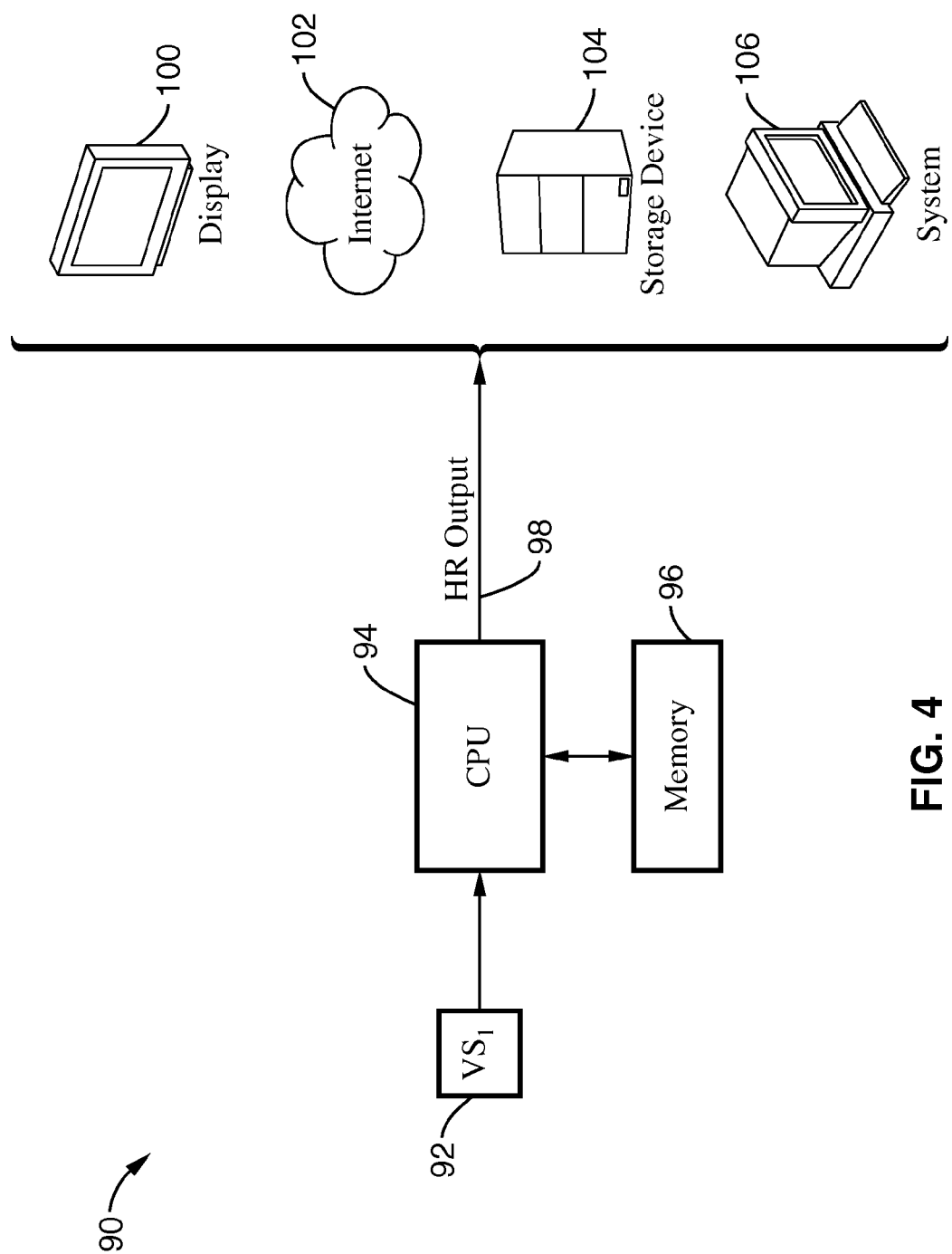
FIG. 4 is a block diagram of a system configured for generating high spatial resolution output according to an embodiment of the present invention.

FIG. 4 illustrates an example embodiment 90 of an imaging system configured for performing innovative super-resolution (spatial resolution) according to the present invention. Output from an image source 92 is shown received by at least one computer 94 (e.g., CPU, microprocessor, DSP, ASIC containing a processor core, and so forth) which has access to at least one memory 96 from which instructions are executed for performing the method according to the present invention and generating enhanced super-resolution output 98.

It should be appreciated that memory 96 can comprise any desired form of memory and combination thereof, into which executable instructions may be received for processing by computer 94, such as internal semiconductor memory (e.g., SRAM, DRAM, FLASH, ROM, and so forth), as well as receiving information from external memory sources including semiconductor memories and media devices.

The enhanced super-resolution output can be utilized in a similar manner as any conventional high-resolution image output, shown by way of example are a display 100, a communication path 102 (e.g., communicating over a network such as the Internet), stored in a storage device 104 (e.g., for later use), received for use by another system or systems 106, and/or utilized in other ways in a manner similar to that of any conventional high-resolution video output.

It should be appreciated, that the present invention may be applied to a number of different applications; for example any application in which super-resolution techniques are applicable for increasing spatial image resolution. Examples include camera systems (e.g., still and video), systems which incorporate cameras, or which process image/video data from camera, and systems configured for processing image/video data which has been stored or which has been received or retrieved from another system.

Figure 5B:
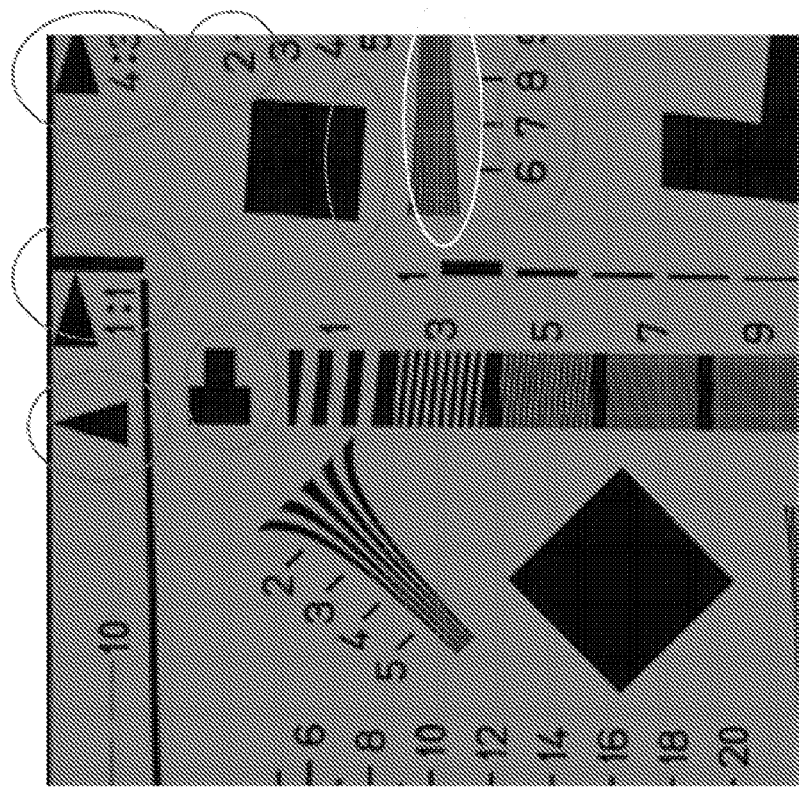
FIG. 5B is an image of a test pattern generated in response to an SR process according to an aspect of the present invention, showing the elimination of ringing artifacts seen in FIG. 5A.
Figure 5A:
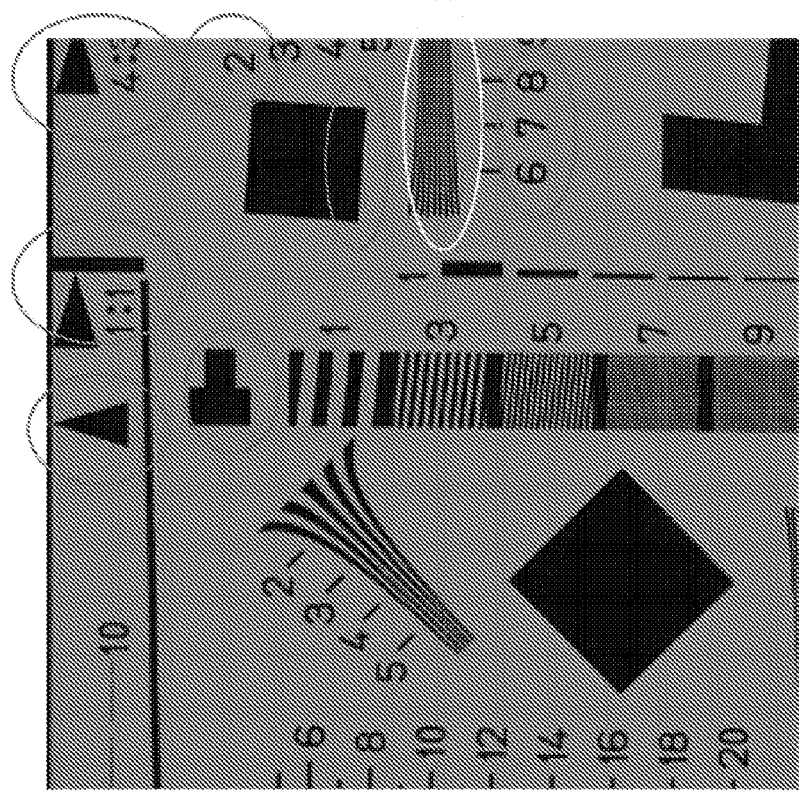
FIG. 5A is an image of a test pattern generated in response to a conventional SR process, showing ringing artifacts arising about the periphery of the targets depicted within the ovals.

FIG. 5A-5B illustrate a comparison between a conventional SR process as shown in FIG. 5A and the improved SR process, with a value of N=7 for a weighted average, as shown in FIG. 5B. It will be noted that ringing appears about the periphery of elements in the conventional SR technique of FIG. 5A (most clearly seen within the circled areas). It should be readily recognized that in the image of FIG. 5B ringing has been substantially eliminated while still providing a sharp image.

It will be appreciated that many benefits are derived from applying the inventive techniques, including the successful suppression of not only ringing artifacts but also of high-frequency noise on each of the test sequences. The resultant pictures from the processes appeared cleaner to the viewer and exhibited little edge degradation. In addition, the pictures appeared sharper than up-sampled pictures, while eliminating strong artificial high-frequency contents. Overall the mechanisms provided a more natural look to the resultant pictures than obtained with previous techniques.

The method of the present invention has been found to successfully suppress noise and ringing artifacts, while balancing the trade-off between sharpness and ringing artifacts. It is expected that additional output improvement can be provided in response to: (1) improving motion estimation, such as through the use of local motion estimation; improving the up-sampling process and/or the masking process; (3) utilizing nearest neighbor techniques for up-scaling the mask; and combinations thereof.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of generating higher-resolution images from lower-resolution images within a super-resolution technique, comprising:
    loading available low-resolution frames;
    estimating motion for available low-resolution frames;
    performing motion masking for available low-resolution frames; and
    performing a frame loop as follows for each frame of the available low-resolution frames for,
        extracting high frequency information from an input super resolution (SR) image for each low-resolution frame, and
        updating high frequency components of the low-resolution frames in response to averaging the high frequency information over a desired number of frames, N, without updating the SR input, and outputting higher resolution versions of the low-resolution frames.

2. A method as recited in claim 1, wherein by increasing the number of frames, N, ringing artifacts are reduced, while less sharpness boost is received in response to the method.

3. A method as recited in claim 1, wherein said updating of the high frequency component comprises averaging performed across a number of frames and is not an up-scale filtering process applied through changing the initial SR picture for each frame within the loop.

4. A method as recited in claim 1, wherein said averaging suppresses non-recurrent noise which is not present across multiple image frames.

5. A method as recited in claim 1, wherein said updating of high frequency components does not change the SR picture being input for performing the high frequency extraction for each frame so that the initial SR image is not subject to contamination from prediction errors.

6. A method as recited in claim 1, further comprising performing said averaging as a weighted average controlled in response to detected image conditions and characteristics of the frames.

7. A method as recited in claim 1, further comprising performing said averaging as a weighted average with higher weights given to high frequency information associated with higher levels of the motion estimation, and lower weights given to high frequency information associated with low accuracy motion estimation.

8. A method as recited in claim 1, wherein said method is performed in response to a computer which executes the method steps as programming executing on a computer, or as media containing programming executable on a computer.

9. A method as recited in claim 1, wherein said method can be utilized within applications selected from the group of imaging applications consisting of still and video cameras, image processing systems, image processing software, medical imaging, industrial imaging, scientific imaging, and combinations thereof.

10. A method of generating higher-resolution images from lower-resolution images within a super-resolution technique, comprising:
    loading available low-resolution frames;
    estimating motion for available low-resolution frames;
    performing motion masking for available low-resolution frames; and
    performing a frame loop as follows for each frame of the available low-resolution frames for,
        extracting high frequency information from an input super resolution (SR) image for each low-resolution frame, and
        updating high frequency components of the images of the low-resolution frames in response to weighted averaging of the high frequency information over a desired number of frames, N, toward suppressing non-recurrent noise and without updating the SR input being input,
            wherein said weighted averaging assigns higher weights to high frequency information associated with higher levels of the motion estimation, and lower weights to high frequency information associated with low accuracy motion estimation,
        outputting higher resolution versions of the low resolution images;
    wherein by increasing the number of frames, N, ringing artifacts are reduced, while less sharpness boost is received in response to the method.

11. A method as recited in claim 10, wherein said updating of the high frequency component comprises averaging performed across a number of frames and is not an up-scale filtering process applied through changing the initial SR picture for each frame within the loop.

12. A method as recited in claim 10, wherein said updating of high frequency components does not change the SR picture being input for performing the high frequency extraction for each frame so that the initial SR image is not subject to contamination from prediction errors.

13. A method as recited in claim 10, wherein said method is performed in response to a computer which executes the method steps as programming executing on a computer, or as media containing programming executable on a computer.

14. A method as recited in claim 10, wherein said method can be utilized within applications selected from the group of imaging applications consisting of still and video cameras, image processing systems, image processing software, medical imaging, industrial imaging, scientific imaging, and combinations thereof.

15. An apparatus for generating higher-resolution images from lower-resolution images within a super-resolution technique, comprising:
    a computer configured for processing sequences of images; and
    programming executable on said computer for,
        loading available low-resolution frames,
        estimating motion for available low-resolution frames,
        performing motion masking for available low-resolution frames,
        extracting high frequency information from an input super resolution (SR) image for each of the available low-resolution frame within a frame loop, and
        updating high frequency components of each of the available low-resolution frames within the frame loop to boost sharpness in response to an averaging of the high frequency information over a desired number of frames, N, without updating the SR input, and outputting higher resolution versions of the low resolution images.

16. An apparatus as recited in claim 15, wherein by increasing the number of frames, N, ringing artifacts are reduced, while less sharpness boost is received in response to the method.

17. An apparatus as recited in claim 15, wherein said averaging suppresses non-recurrent noise which is not present across multiple image frames.

18. An apparatus as recited in claim 15, further comprising performing said averaging as a weighted average controlled in response to detected image conditions and characteristics of the frames.

19. An apparatus as recited in claim 15, further comprising performing said averaging as a weighted average with higher weights given to high frequency information associated with higher levels of the motion estimation, and lower weights given to high frequency information associated with low accuracy motion estimation.

20. A computer-readable media containing a computer program executable on a computer configured for performing a super-resolution technique on video images and causing the computer to output images having higher spatial resolution that the images being input to the computer, comprising:
  loading available low-resolution frames;
  estimating motion for available low-resolution frames;
  performing motion masking for available low-resolution frames;
  extracting high frequency information from an input super resolution (SR) image for each of the available low-resolution frame within a frame loop;
  updating high frequency components of each of the available low-resolution frames within the frame loop in response to an averaging of the high frequency information to boost low resolution frame sharpness;
  wherein said averaging is performed over a desired number of frames N;
  said updating performed without updating the SR input; and
  outputting higher resolution versions of the low resolution images.

* * * * *